United States Patent Office 3,351,588
Patented Nov. 7, 1967

3,351,588
DIBENZ[b,e]AZEPINE DERIVATIVE
Martin A. Davis and Ferenc Herr, Montreal, Quebec, Canada, assignors to American Home Products Corporation, New York, N.Y., a corporation of Delaware
No Drawing. Filed Sept. 14, 1965, Ser. No. 487,293
4 Claims. (Cl. 260—239.3)

ABSTRACT OF THE DISCLOSURE

The pharmacologically active compound 11-[(1-methyl-3 - pyrrolidyl)methyl] - 6-keto - 5,6-dihydrodibenz[b,e]-azepine and its acid addition salts with pharmacologically acceptable acids such as hydriodic acid and maleic acid are disclosed. They possess high antispasmodic activity but have virtually no depressant activity on the central nervous system. There is also disclosed a process for the preparation of these compounds starting with 1-methyl-3-pyrrolidylmethyl chloride and going through the intermediate 11-hydroxy-11-[(1-methyl-3-pyrrolidyl)methyl]-6-keto-5,6-dihydrodibenz[b,e] azepine. New dosage forms for oral and parenteral administration are described.

---

This invention relates to a novel chemical compound, an 11 - substituted 6 - keto-5,6-dihydroibenz[b,e]azepine, and to its salts with pharmacologically acceptable acids. The compound and its salts have useful biological properties.

More particularly, this invention relates to the 11-substituted 6-keto-5,6-dihydrodibenz[b,e]azepine of the formula:

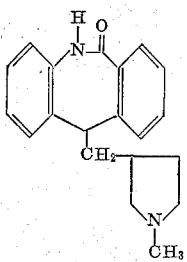

and to its salts with pharmacologically acceptable acids.

This compound, in base form, is the compound 11-[(1-methyl - 3-pyrrolidyl)methyl]-6-keto-5,6-dihydrodibenz-[b,e]-azepine, known also as 11-[(1-methyl-3-pyrrolidyl)-methyl]-6(5H)-morphanthridinone.

The new compound, both in base form, and as its acid addition salts with pharmacologically acceptable acids, possesses the useful biological property of having antispasmodic activity with little or no central-depressant activity. It is thus, an antispasmodic agent which does not cause noticeable central depression.

The compound of this invention, in base form, is related structurally to the compound 11-(3-dimethylamino-propyl)-6-keto-5,6-dihydrodibenz[b,e]azepine which has been described in U.S. Patent 3,084,155 (1963) and in the publication of S. O. Winthrop et al. in J. Med. Pharm. Chem., 5 1199 (1962). The compound, as disclosed therein was shown to possess useful psychotropic properties characteristic of tranquilizers and antidepressants belonging to the chloropromazine-amitriptyline classes of compounds, respectively At the same time the compound was shown to have antispasmodic activity of the atropine type, thus indicating potential use as anticholinergic-anti-spasmodic agent with a marked degree of central nervous system effects. An agent of this sort would be of benefit in the treatment of gastrointestinal disorders in which disturbances of the central nervous system are also present. Many preparations are today employed which contain physical mixtures of an anticholergic agent (e.g. atropine) with a central depressant (e.g. phenobarbital). Such preparations occupy a significant place in the therapy of such disorders as gastric hypermotility and peptic ulcer. The compound of U.S. Patent 3,084,155, since it combines in the one molecule both antispasmodic and psychotropic effects, would be indicated as a possible treatment for the abovementioned and related disorders.

In certain forms of therapy it is, however, desirable to use an antispasmodic agent which has no significant component of central nervous system activity. Thus the agent may be administered even in relatively high dosages without fear of disturbing central effects. If it is necessary to produce a central effect, for example sedation, a sedative agent may be added in an amount exactly needed to produce the effect, that is the dosages of the two agents may be precisely adjusted so as to produce the optimal effects. It is well-known that certain synthetic compounds, for example, the compounds of U.S. Patent 3,084,155 or even the widely used alkaloid, atropine do not possess a clear-cut separation of antispasmodic from central effects. The compounds of the present invention, 11 - [(1 - methyl - 3-pyrrolidyl)methyl]-6-keto-5,6-dihydrodibenz[b,e]azepine, does indeed possess this separation, a finding which is surprising and unexpected when due regard is given to its chemical structure. When compared to the compound of U.S. Patent 3,084,155 in a test for antispasmodic activity, it is shown to possess a fifteen-fold increase in activity. Thus at a dose of 1 mg./kg. given orally to rats which had previously been given a meal of barium sulfate, it produces a remarkable increase in gastric residue of 334% over the control values, that is it exhibits a very high degree of inhibition of gastric motility, a degree of activity which is indeed greater than that of the widely-used drug atropine. However, the same dose of the compound of U.S. Patent 3,084,155 reduces gastric motility in the rat by only 22%. The marked increase in antispasmodic activity of the compound of this invention over the known compound is not accompanied by an increase in central-nervous system activity. Indeed the present compound possesses a vastly decreased component in central activity, being only one-twentyfifth as active in this respect. In a test used to demonstrate central activity, for example the effect of potentiating the action of a sub-hypnotic dose of ethyl alcohol, the present compound has an $ED_{50}$ of only 72 mg./kg. when given intraperitoneally to mice. In the same test, the compound of U.S. Patent 3,084,155 is far more potent, having an $ED_{50}$ of 3.1 mg./kg. This marked reduction of central nervous system depressant activity as shown by the weak effect on the potentiation of ethyl alcohol hypnosis is remarkable and unexpected in a compound of this chemical structure. The 1-methyl-3-pyrrolidylmethyl side chain has been attached to a variety of tricyclic ring systems and in general the resulting compound has either the same or an enhanced effect on alcohol potentiation over the analogous compound containing a 3-dimethylaminopropyl group. It is to be noted that in compounds containing these side chains, the tricyclic ring and the terminal nitrogen atom are separated by a linkage of three carbon atoms, a necessary prerequisite to contral nervous system activity for agents of this class. The data showing the effect on alcohol potentiation in pairs of compounds containing the 5-dibenzo[a,d]cycloheptadiene ring are given in J. Med. Chem. 6 338 (1963); [compare compounds 1 and 31, 2 and 32, 3 and 33] while those containing the dibenzo[a,d] cyclooctadiene ring are described in the same Journal, Page 130, [compare 1B and 4B, 1C and 4C].

The compound 11-[(1-methyl-3-pyrrolidyl)methyl]-6-keto-5,6-dihydrodibenz[b,e]azepine, either in base form or as an acid addition salt with a pharmacologically acceptable acid may be formulated as a medicament in the form of solutions or syrups in aqueous vehicles for oral or parenteral administration, or preferably as capsules or tablets for oral administration containing excipients such as, for example, starch, lactose, glucose, magnesium stearate, magnesium trisilicate, or certain vegetable gums. For oral use, such dosage forms may be administered containing amounts of the active ingredient varying from 2 to 20 mg. per day in suitably divided doses.

The following descriptive examples will illustrate our invention:

EXAMPLE 1

A solution of 1-methyl-3-pyrrolidylmethyl chloride (20.6 g., 0.155 mole) in dry tetrahydrofuran (20 ml.) is added dropwise to a stirred suspension of magnesium turnings (3.76 g., 0.155 g. atom) in dry tetrahydrofuran (30 ml.) containing a small crystal of iodine. When the initial reaction has susbsided the mixture is heated under reflux for one half hour. The Grignard reagent thus formed is then added dropwise to a solution of 6,11-diketo-5,6-dihydrodibenz[b,e]azepine (11.2 g., 0.05 mole) in a mixture of tetrahydrofuran (150 ml.) and dioxane (150 ml.). The reaction mixture is heated under reflux for two hours and about one-half of the solvent is removed in vacuo. The Grignard complex is poured into ice-water containing a molar excess of ammonium chloride. The water-insoluble material is removed by filtration to give essentially unchanged ketone. The aqueous layer is extracted with ethylene dichloride, the organic layer dried, and the solvent removed in vacuo, to yield the free base as a solid with a melting range of 88–110° C. The presence of the desired product, 11-hydroxy-11-[(1 - methyl - 3-pyrrolidyl)methyl]-6-keto-5,6-dihydrodibenz[b,e]-azepine is confirmed by examination of the infrared spectrum ($\gamma_{max}$. 1655, 3475 cm$^{-1}$).

EXAMPLE 2

A mixture of the compound prepared as described in Example 1 (13.0 g.), 56% hydriodic acid (130 ml.), glacial acetic acid (60 ml.) and red phosphorus (6 g.) is heated under reflux for 65 hours. It is then filtered, concentrated in vacuo and the residual hydriodide salt is converted to the free base by treatment with dilute aqueous sodium hydroxide solution. The free base 11-[(1-methyl - 3-pyrrolidyl)methyl]-6-keto-5,6-dihydrodibenz[b,e]azepine is obtained by trituration with hexane with M.P. 141–145° C.

EXAMPLE 3

Treatment of the free base obtained as in Example 2 with a small molar excess of ethereal maleic acid yields the maleic addition salt, M.P. 179–180° C. (dec.) (from ethanol-ether). Analysis confirms the empiric formula $C_{24}H_{26}N_2O_5$.

We claim:

1. A compound selected from the group which consists of 11-[(1-methyl-3-pyrrolidyl)methyl]-6-keto-5,6-dihydrodibenz[b,e]azepine and its acid addition salts with pharmacologically acceptable acids.

2. 11 - [(1-methyl-3-pyrrolidyl)methyl]-6-keto-5,6-dihydrodibenz[b,e]azepine.

3. The hydriodic acid addition salt of 11-[(1-methyl-3-pyrrolidyl)methyl] - 6 - keto - 5,6-dihydrodibenz[b,e]azepine.

4. The maleic acid addition salt of 11-[(1-methyl-3-pyrrolidyl)methyl] - 6 - keto-5,6-dihydrodibenz[b,e]azepine.

References Cited

UNITED STATES PATENTS

| | | | |
|---|---|---|---|
| 2,973,354 | 2/1961 | Werner | 260—239.3 |
| 3,084,155 | 4/1963 | Winthrop et al. | 260—239.3 |

FOREIGN PATENTS

| | | |
|---|---|---|
| 961,106 | 6/1964 | Great Britain. |
| 972,082 | 10/1964 | Great Britain. |

WALTER A. MODANCE, *Primary Examiner.*

R. T. BOND, *Assistant Examiner.*